and the auger rotated by swinging
UNITED STATES PATENT OFFICE.

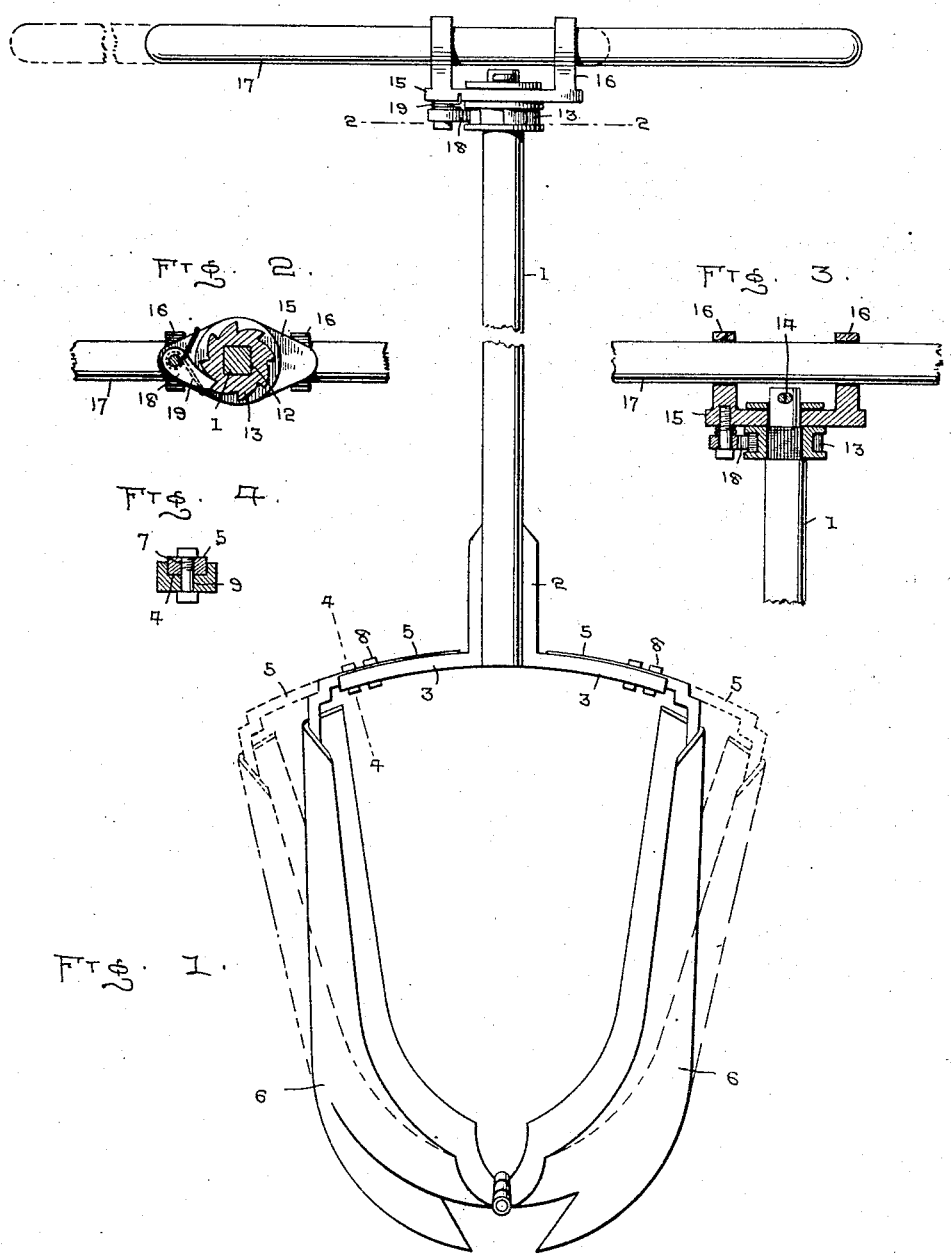

JOHN CALVIN SCHLADOR, OF SILVERTON, OREGON.

AUGER.

1,199,432.　　　　　　Specification of Letters Patent.　　Patented Sept. 26, 1916.

Application filed May 15, 1915, Serial No. 28,392.　Renewed February 9, 1916.　Serial No. 77,349.

*To all whom it may concern:*

Be it known that I, JOHN CALVIN SCHLADOR, a citizen of the United States, residing at Silverton, in the county of Marion and State of Oregon, have invented certain new and useful Improvements in Augers; and I do hereby declare the following to be a full, clear, and exact description of the invention, such as will enable others skilled in the art to which it appertains to make and use the same.

My invention relates to new and useful improvements in augers and more particularly to that class adapted to be used for digging post holes, and my object is to provide means for adjusting the cutting blades whereby holes of various diameters may be produced.

A further object is to provide a ratchet construction at the upper end of the auger whereby the auger may be operated when in position adjacent an object.

Other objects and advantages will be hereinafter set forth and more particularly pointed out in the accompanying specification.

In the accompanying drawings which are made a part of this application, Figure 1 is a side elevation of the auger showing the cutting blades thereof in extended position by dotted lines. Fig. 2 is a detail sectional view as seen on line 2—2 of Fig. 1. Fig. 3 is a transverse sectional view through the construction at the upper end of the auger stem, and Fig. 4 is a detailed sectional view as seen on line 4—4 of Fig. 1.

Referring to the drawings in which similar reference numerals designate corresponding parts throughout the several views, 1 indicates a stem to the lower end of which is secured the frame portion 2 of the auger, said frame consisting of downwardly and outwardly projecting arms 3, the upper faces of which are provided with channels 4, and adjustably mounted in said channels are the shanks 5 of the cutting blades 6, said cutting blades being constructed in the usual or any preferred manner and hinged together at their lower ends.

The shanks 5 are provided with longitudinal slots 7, through which extend adjusting bolts 8, said bolts being extended through openings 9 in the arms 3 and by extending the slots 7 substantially the full length of said shanks, the cutting blades 6 may be adjusted inwardly or outwardly to produce openings of various diameters.

The upper end of the stem 1 is preferably constructed square in cross section and enters the square opening 12 of a ratchet wheel 13 so that said wheel and stem will rotate in unison. Immediately above the ratchet 13, the stem is reduced in size and formed circular, thus providing a stud 14 upon which is rotatably mounted a plate 15, said plate being oblong in general outline and having adjacent its ends integral ears 16 through which extends any suitable form of handle bar 17. To the under face of the plate 15 is pivotally attached a pawl 18 which is normally held in engagement with the ratchet wheel 13 by means of a spring 19.

By mounting the handle bar in the manner shown, it can be used for rotating the auger in the usual manner, that is to say, by disposing the ends of the bar at equal distances on opposite sides of the stem and alternately grasping the ends of the bar to impart rotating motion to the auger.

In some instances, as when a hole is being bored adjacent a fence or wall, it is necessary to position the auger so close to the object that the handle bar could not be given a complete rotation, but by providing the ratchet and pawl, the handle bar can be moved to the position shown in dotted lines in Fig. 1 and the auger rotated by swinging the free end of the handle bar back and forth, the pawl riding over the ratchet when the handle bar is swung in one direction and imparting rotating movement to the auger when the handle bar is swung in the opposite direction. In this manner, the auger can be positioned in close proximity to an object and the hole bored as readily as under normal conditions and it is not necessary for the operator to release his grip upon the handle bar when the ratchet mechanism is employed for rotating the auger, thus saving time and exertion.

What I claim is:—

An auger comprising a stem, a frame attached to the stem provided with projecting channeled arms, cutting blades hinged together at their lower ends and provided with longitudinally slotted stems located in said channels, bolts for adjustably securing the stems in the channels, and means for rotating the stem.

In testimony whereof I have signed my name to this specification in the presence of two subscribing witnesses.

JOHN CALVIN SCHLADOR.

Witnesses:
P. L. BROWN,
GRACE M. BOYLES.

Copies of this patent may be obtained for five cents each, by addressing the "Commissioner of Patents, Washington, D. C."